United States Patent
Hicken

(10) Patent No.: US 7,613,736 B2
(45) Date of Patent: Nov. 3, 2009

(54) SHARING MUSIC ESSENCE IN A RECOMMENDATION SYSTEM

(75) Inventor: Wendell T. Hicken, La Verne, CA (US)

(73) Assignee: Resonance Media Services, Inc., San Francisco, CA (US)

( * ) Notice: Subject to any disclaimer, the term of this patent is extended or adjusted under 35 U.S.C. 154(b) by 144 days.

(21) Appl. No.: 11/439,723

(22) Filed: May 23, 2006

(65) Prior Publication Data

US 2006/0265349 A1 Nov. 23, 2006

Related U.S. Application Data

(60) Provisional application No. 60/683,685, filed on May 23, 2005.

(51) Int. Cl.
G06F 17/00 (2006.01)

(52) U.S. Cl. .............. 707/104.1; 707/101; 707/102; 707/103 R; 717/140

(58) Field of Classification Search .......... 707/1–10, 707/100–104.1, 200–206
See application file for complete search history.

(56) References Cited

U.S. PATENT DOCUMENTS

| | | | |
|---|---|---|---|
| 4,807,169 A | 2/1989 | Overbeck |
| 4,996,642 A | 2/1991 | Hey |
| 5,124,911 A | 6/1992 | Sack |
| 5,210,611 A | 5/1993 | Yee et al. |
| 5,233,520 A | 8/1993 | Kretsch et al. |
| 5,412,564 A | 5/1995 | Ecer |
| 5,583,763 A | 12/1996 | Atcheson et al. |
| 5,612,729 A | 3/1997 | Ellis et al. |
| 5,616,876 A | 4/1997 | Cluts |
| 5,644,727 A | 7/1997 | Atkins |
| 5,703,308 A | 12/1997 | Tashiro et al. |
| 5,704,017 A | 12/1997 | Heckerman et al. |
| 5,724,567 A | 3/1998 | Rose et al. |
| 5,734,444 A | 3/1998 | Yoshinobu |
| 5,749,081 A | 5/1998 | Whiteis |
| 5,754,938 A | 5/1998 | Herz et al. |
| 5,790,426 A | 8/1998 | Robinson |
| 5,812,937 A | 9/1998 | Takahisa et al. |

(Continued)

OTHER PUBLICATIONS

Co-pending U.S. Appl. No. 10/278,636, filed Oct. 23, 2002; Entitled Automated Music Profiling And Recommendation.

(Continued)

*Primary Examiner*—Isaac M Woo
(74) *Attorney, Agent, or Firm*—Christie, Parker & Hale, LLP

(57) ABSTRACT

A system for sharing playlists and playlist essence with different users. A user desiring to share his or her playlist generates the playlist and a playlist characterization. The playlist characterization is based on acoustic analysis data of one or more songs in the playlist. The playlist and playlist characterization is then transmitted to another end user device. The end user device receiving the shared playlist searches the user's music collection for the songs in the playlist. If a gap is detected in the playlist because the receiving user does not own a particular song, the receiving end user devices automatically selects another song that is owned by the user to fill-in the gap. The song is selected based on the playlist characterization with the aim of preserving the essence of the shared playlist.

14 Claims, 4 Drawing Sheets

U.S. PATENT DOCUMENTS

| | | | |
|---|---|---|---|
| 5,832,446 A | 11/1998 | Neuhaus |
| 5,859,414 A | 1/1999 | Grimes et al. |
| 5,872,850 A | 2/1999 | Klein et al. |
| 5,884,282 A | 3/1999 | Robinson |
| 5,899,502 A | 5/1999 | Del Giorno |
| 5,918,223 A | 6/1999 | Blum et al. |
| 5,954,640 A | 9/1999 | Szabo |
| 5,960,440 A | 9/1999 | Brenner et al. |
| 5,963,948 A | 10/1999 | Shilcrat |
| 5,969,283 A | 10/1999 | Looney et al. |
| 5,978,766 A | 11/1999 | Luciw |
| 5,979,757 A | 11/1999 | Tracy et al. |
| 5,999,975 A | 12/1999 | Kittaka et al. |
| 6,009,392 A | 12/1999 | Kanevsky et al. |
| 6,012,051 A | 1/2000 | Sammon, Jr. et al. |
| 6,018,738 A | 1/2000 | Breese et al. |
| 6,020,883 A | 2/2000 | Herz et al. |
| 6,029,195 A | 2/2000 | Herz |
| 6,041,311 A | 3/2000 | Chislenko et al. |
| 6,046,021 A | 4/2000 | Bochner |
| 6,061,680 A | 5/2000 | Scherf et al. |
| 6,088,455 A | 7/2000 | Logan et al. |
| 6,112,186 A | 8/2000 | Bergh et al. |
| 6,148,094 A | 11/2000 | Kinsella |
| 6,192,340 B1 | 2/2001 | Abecassis |
| 6,232,539 B1 | 5/2001 | Looney et al. |
| 6,236,978 B1 | 5/2001 | Tuzhilin |
| 6,236,990 B1 | 5/2001 | Geller et al. |
| 6,243,725 B1 | 6/2001 | Hempleman et al. |
| 6,288,319 B1 | 9/2001 | Catona |
| 6,358,546 B1 | 3/2002 | Bebiak et al. |
| 6,442,517 B1 | 8/2002 | Miller et al. |
| 6,446,261 B1 | 9/2002 | Rosser |
| 6,453,252 B1 | 9/2002 | Laroche |
| 6,512,837 B1 | 1/2003 | Ahmed |
| 6,539,395 B1 | 3/2003 | Gjerdingen et al. |
| 6,601,237 B1 | 7/2003 | Ten Kate et al. |
| 6,657,117 B2 | 12/2003 | Weare et al. |
| 6,671,550 B2 | 12/2003 | Iaizzo et al. |
| 6,697,779 B1 | 2/2004 | Bellegarda et al. |
| 6,721,489 B1 | 4/2004 | Benyamin et al. |
| 6,725,102 B2 | 4/2004 | Sun |
| 6,771,797 B2 | 8/2004 | Ahmed |
| 6,823,225 B1 | 11/2004 | Sass |
| 6,941,275 B1 | 9/2005 | Swierczek |
| 6,941,324 B2 | 9/2005 | Plastina et al. |
| 6,953,886 B1 | 10/2005 | Looney et al. |
| 6,961,430 B1 | 11/2005 | Gaske et al. |
| 6,961,550 B2 | 11/2005 | Ricard et al. |
| 6,963,975 B1 | 11/2005 | Weare |
| 6,967,275 B2 | 11/2005 | Ozick |
| 6,990,453 B2 | 1/2006 | Wang et al. |
| 6,993,532 B1 | 1/2006 | Platt et al. |
| 7,003,515 B1 | 2/2006 | Glaser et al. |
| 7,010,485 B1 | 3/2006 | Baumgartner et al. |
| 7,022,905 B1 | 4/2006 | Hinman et al. |
| 7,031,980 B2 | 4/2006 | Logan et al. |
| 7,075,000 B2 | 7/2006 | Gang et al. |
| 7,081,579 B2 | 7/2006 | Alcalde et al. |
| 7,171,174 B2 | 1/2007 | Ellis et al. |
| 7,200,529 B2 | 4/2007 | Cifra et al. |
| 7,205,471 B2 | 4/2007 | Looney et al. |
| 7,313,571 B1 | 12/2007 | Platt et al. |
| 7,326,848 B2 | 2/2008 | Weare et al. |
| 7,373,209 B2 | 5/2008 | Tagawa et al. |
| 2001/0053944 A1 | 12/2001 | Marks et al. |
| 2002/0037083 A1 | 3/2002 | Weare et al. |
| 2002/0038597 A1 | 4/2002 | Huopaniemi et al. |
| 2002/0049717 A1 | 4/2002 | Routtenbourg et al. |
| 2002/0083060 A1 | 6/2002 | Wang et al. |
| 2002/0088336 A1 | 7/2002 | Stahl |
| 2003/0046421 A1 | 3/2003 | Horvitz et al. |
| 2003/0055516 A1 | 3/2003 | Gang et al. |
| 2003/0072463 A1 | 4/2003 | Chen |
| 2003/0100967 A1 | 5/2003 | Ogasawara |
| 2003/0106413 A1 | 6/2003 | Samadani et al. |
| 2003/0183064 A1* | 10/2003 | Eugene et al. ............ 84/609 |
| 2004/0002310 A1 | 1/2004 | Herley et al. |
| 2004/0049540 A1 | 3/2004 | Wood |
| 2004/0107268 A1 | 6/2004 | Iriya et al. |
| 2005/0038819 A1 | 2/2005 | Hicken et al. |
| 2005/0065976 A1 | 3/2005 | Holm et al. |
| 2006/0004640 A1 | 1/2006 | Swierczek |
| 2006/0020614 A1 | 1/2006 | Kolawa et al. |
| 2006/0026048 A1 | 2/2006 | Kolawa et al. |
| 2006/0083119 A1 | 4/2006 | Hayes |
| 2006/0122839 A1 | 6/2006 | Wang et al. |
| 2006/0190450 A1 | 8/2006 | Holm et al. |
| 2006/0224260 A1 | 10/2006 | Hicken et al. |
| 2006/0242665 A1 | 10/2006 | Knee et al. |

OTHER PUBLICATIONS

Allamanche, Eric et al., "Content-based Identification of Audio Material Using MPEG-7 Low Level Description"; 2001; 8 pp.

AudioID—Automatic Identification/Fingerprinting of Audio; http://www.emt.iis.fhg.de/produkte/audioid, Fraunhofer Institut IntegrierteSchaltungen; 5 pp.

Cheng, et al., "Beat Detection Algorithm"; http://www-dsp.rice.edu/courses/el...Projects01/beat_sync /beatalgo.html; 2001; 6 pp.

Bill Communications Inc. *A Steady Stream of New Applications . . . Institutional Distribution*; v. 19; Nov. 1983, 9 pp.

Co-Pending U.S. Appl. No. 09/556,051, filed Apr. 21, 2000, entitled Method and Apparatus for Automated Selection Organization and Recommendation of Items Based on User Preference Topography, 83 pgs. (37273).

Co-pending U.S. Appl. No. 09/885,307, filed Jun. 20, 2001, entitled Acoustical Preference Tuner, 36 pages. (41182).

Information Technology-Multimedia Content Description Interface-Part 4: Audio, dated Jun. 9, 2001, 119 pgs.

\* cited by examiner

SHARING MUSIC ESSENCE IN A RECOMMENDATION SYSTEM

CROSS-REFERENCE TO RELATED APPLICATION(S)

This application claims the benefit of U.S. Application Ser. No. 60/683,685 filed on May 23, 2005 the content of which is incorporated herein by reference.

This application also contains subject matter that is related to the subject matter of U.S. application Ser. No. 10/917,865, filed on Aug. 13, 2004, and U.S. application Ser. No. 10/278,636, filed on Oct. 23, 2002, the content of both of which are incorporated herein by reference.

FIELD OF THE INVENTION

This invention relates generally to music recommendation systems, and more specifically, to sharing music essence in a music recommendation system.

BACKGROUND OF THE INVENTION

Today's music scene provides a user with hundreds and thousands of different types of music that may be available for his or her enjoyment. The vast selection arena creates a dilemma for the user when faced with a decision as to the particular piece of music or album to listen or purchase.

U.S. application Ser. No. 10/917,865 describes a music recommendation system where a user may generate a playlist or search for music, using a song, album, or artist that is owned by the user as the search seed. After generating such a playlist, the generating user may want to share it with other users. However, one potential problem in sharing the playlist is that the receiving user may not have access to all of the songs in the shared playlist, leaving one or more gaps in the playlist. Accordingly, what is desired is a system and method for sharing playlists with other users that detects and intelligently fills such gaps in the shared playlists.

SUMMARY OF THE INVENTION

The present invention is directed to systems and methods for sharing playlists and playlist music characterization/essence with each other. According to one embodiment, an end user desiring to share his or her playlist invokes his or her end user device to select one or more songs from a data store, generate a playlist based on the selected songs, retrieve acoustic analysis data of one or more songs in the playlist, generate a playlist characterization based on the acoustic analysis data, and transmit the playlist and the playlist characterization to a remote end device.

According to one embodiment of the invention, the playlist characterization is based on acoustic analysis data of at least one song in the playlist. The playlist characterization may also be based on a group profile of the playlist where the group profile is generated based on acoustic analysis data of a plurality of songs in the playlist. The playlist characterization may further be based on a group profile of an artist associated with the playlist, or a group profile of an album associated with the playlist.

According to one embodiment, another end user device is configured to receive shared playlists. The end user device according to this embodiment receives a playlist of songs and searches a data store for the songs in the playlist. The data store may be a local or remote data store. The end user device identifies a first song in the playlist unavailable in the data store, and responsive to the identification of the first song, automatically identifies a second song available in the data store for replacing the first song. In identifying the second song, the end user device retrieves a playlist characterization and selects a second song based on the playlist characterization. The end user device then generates a modified playlist of songs which replaces the first song with the second song. The end user device may then play the modified playlist via a music player.

A person of skill in the art will appreciate that the system and method of the present invention aims to preserve the essence of the shared playlist in generating modified playlists. These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, the present invention is directed to a system and method that allows users to share playlists and playlist music essence with each other. In doing so, embodiments of the present invention seek to capture the essence (also referred to as "mood" or "characteristic") of the playlist being shared, and use the captured essence to fill-in gaps in the playlist. The gaps may be a result of the receiving user not having access to certain songs in the playlist that has been shared. According to one embodiment, the gaps in the playlist are filled with songs to which the receiving user does have access, and which are aimed to maintain the basic essence of the playlist.

In an exemplary scenario, a user may generate an exercise playlist that includes various upbeat music, or a relaxation playlist that includes soft music. In maintaining the essence of each playlist, the songs that are selected to replace certain unavailable songs in the exercise playlist are also upbeat, and songs that are selected to replace certain unavailable songs in the relaxation playlist are also soft.

Figure 1:
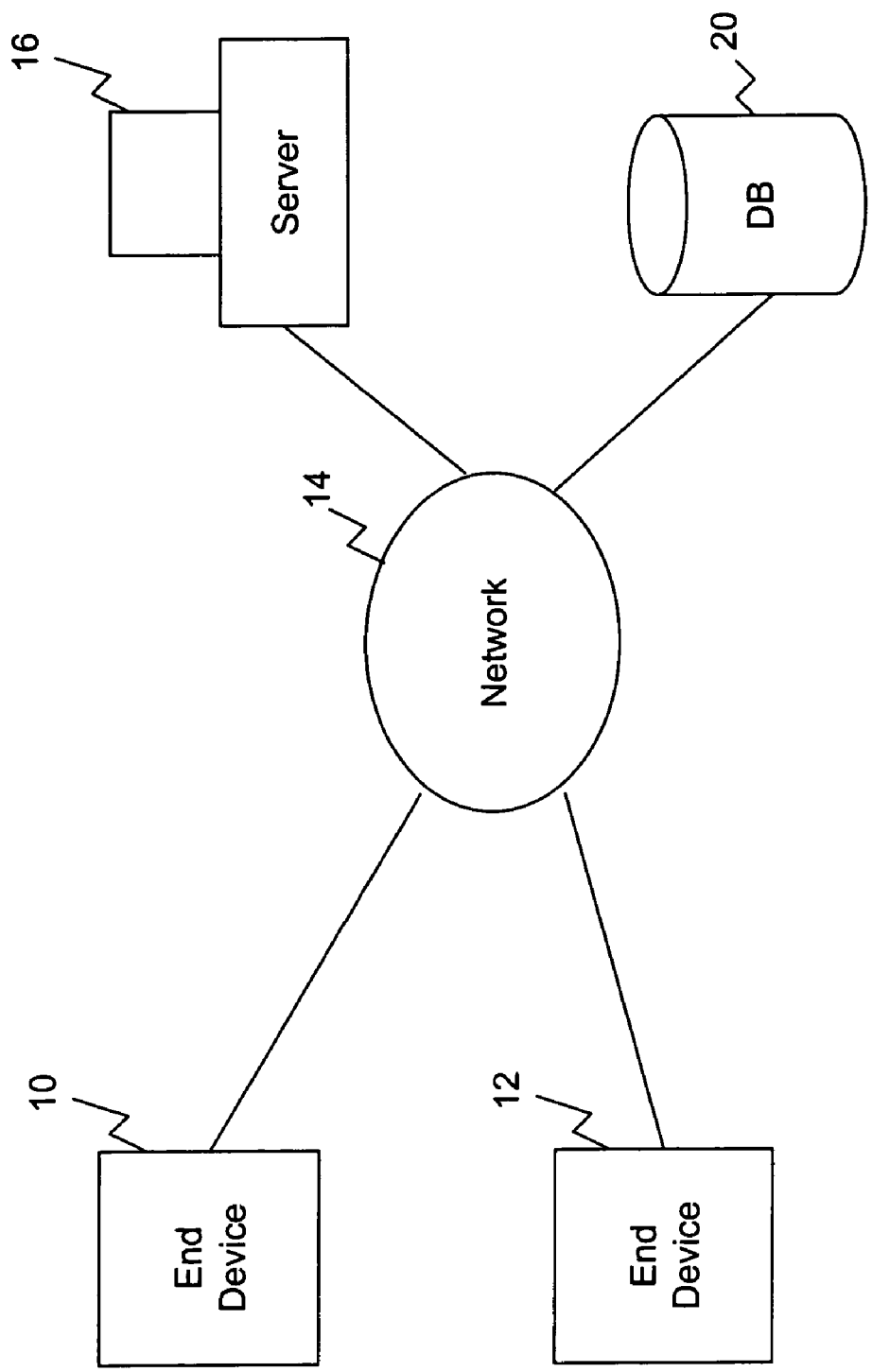
FIG. 1 is a block diagram of a system for sharing music essence according to one embodiment of the invention.

FIG. 1 is a block diagram of a system for sharing music essence according to one embodiment of the invention. The system includes a first user device 10 capable of communicating with a second user device 12 over a data communications network 14. The user devices 10, 12, are also coupled to a server 16 and remote database 20 over the data communications network. The remote database 20 stores various audio pieces for downloading and/or listening by the user devices 10, 12. The server 16 provides various tools for allowing the user device 10 to share its playlist and/or music essence with the user device 12.

The data communications network 14 may be a wireless network implemented using one or more of a wide variety of wireless solutions. For example, the wireless network may include, without limitation, a cellular telephone network such as a Global System for Mobile communications (GSM) or General Packet Radio Service (GPRS), a wireless local area network such as 802.11a, 802.11b, or 802.11g (collectively referred to as 802.11), or a personal area network such as Bluetooth. The data communications network 14 may also take the form a local area network, a wide area network, or the Internet.

Each user device 10, 12 may be a personal computer, laptop, cellular phone, personal digital assistant (PDA), car player, home player, personal entertainment device, or another consumer electronics device conventional in the art. According to one embodiment of the invention, the user device 10 is configured with the necessary software and hardware for generating playlists of songs and transmitting such playlists to the user device 12. In addition, the user device 10 is configured to capture the essence of a generated playlist and publish the captured essence on the server 16 or directly to the user device 12.

According to one embodiment of the invention, the captured essence is an acoustic characterization of the playlist based on the acoustic properties of the songs in the playlist. In this respect, the characterization may be acoustic analysis data of one or more songs in the playlist, acoustic profile of the playlist, acoustic profile of artists associated with the playlist, acoustic profile of albums associated with the playlist, or some other group profile associated with the playlist.

The acoustic analysis data of a particular audio piece in the playlist may be generated by the device generating the playlist characterization, downloaded from a remote server such as, for example, the server 16, or obtained from another device. In generating the acoustic analysis data, the generating device engages in automatic analysis of the audio signals of the audio piece via an audio content analysis algorithm. The audio content analysis algorithm takes the audio signals and determines its acoustic properties/attributes, such as, for example, tempo, repeating sections in the audio piece, energy level, presence of particular instruments (e.g. snares and kick drums), rhythm, bass patterns, harmony, particular music classes (e.g. jazz piano trio), and the like. The audio content analysis algorithm computes values of these acoustic properties as described in more detail in the above-referenced U.S. patent application Ser. No. 10/278,636. As the value of each acoustic property is computed, it is stored into an acoustic attribute vector as the audio description or analysis data for the audio piece. The acoustic attribute vector thus maps calculated values to their corresponding acoustic attributes to provide an object measurement of those attributes.

Profile data of a group of audio pieces, such as the audio pieces in a playlist, in an album, or associated with a particular artist, may be generated based on the acoustic analysis data of the audio pieces associated with the group. The group profile may be represented as a group profile vector that stores coefficient values for the various attribute fields of an acoustic attribute vector. Each coefficient value may be represented as a ratio of points of deviation that is represented by the following formula:

$$(avg[sub]-avg[all])/var[all]$$

where avg[all] is the average value of a particular attribute across all the known songs in a current database, avg[sub] is the average value of the particular attribute across a subset of the songs belonging to the group for which the profile is to be generated, and var[all] is a variance of the values computed for the particular attribute across all the known songs.

According to one embodiment of the invention, a coefficient value of a particular attribute is high if the subset of songs is typically different from the average of a larger group of songs with respect to the attribute, or if the variance value is small. Thus, the coefficients help determine the most distinct and unique attributes of a set of songs with respect to a larger group. Additionally, the sign of the coefficient indicates the direction in which the subset of songs is different than the average.

Figure 2:
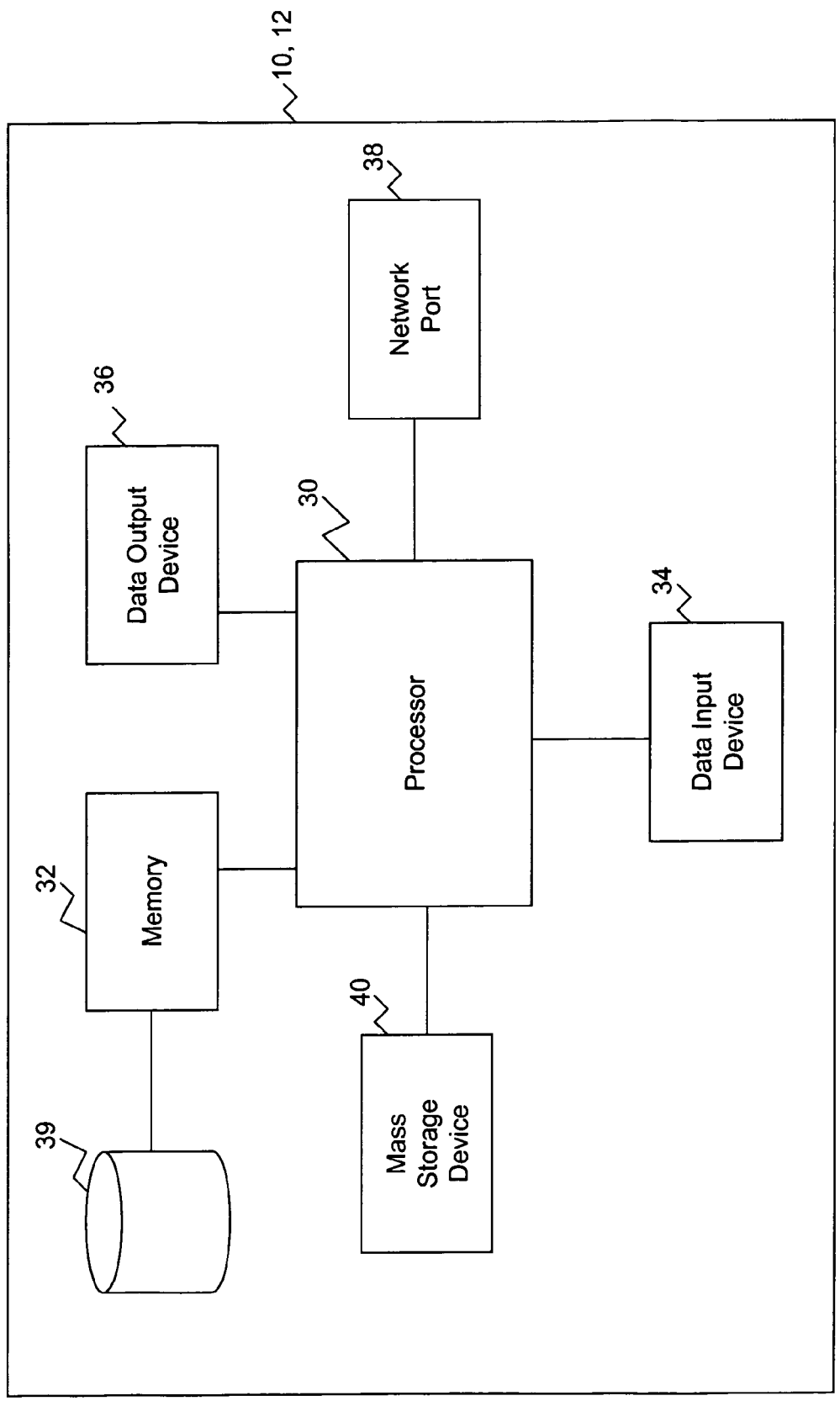
FIG. 2 is a detailed block diagram of an end user device generating and sharing playlists according to one embodiment of the invention.

FIG. 2 is a detailed block diagram of the end user device 10, 12 generating and sharing playlists according to one embodiment of the invention. The device 10, 12 includes a processor 30, memory 32, data input device 34, data output device 36, network port 38, and mass storage device 40. The data input device 34 may include a keyboard, keypad, stylus, microphone, remote controller, and the like, for allowing a user to enter his or her selection information.

The data output device 36 may include a display screen for displaying text and/or graphics, speakers for outputting audio sounds, or the like. Pressure sensitive (touch screen) technology may also be incorporated into the display screen for allowing a user to provide additional data input by merely touching different portions of the display screen.

The mass storage device 40 may include a static random access memory device, a hard disk, and/or the like. The device stores the music owned by the user of the device, as well as information associated with the music such as, for example, metadata information, fingerprint information, acoustic analysis data, and/or profile data. The analysis data and/or profile data may then be used for generating the playlist characterizations when sharing playlists, or for filling gaps in shared playlists received by the end user device.

The network/peripheral port 38 may allow the end user device to connect to the data communications network 14 or to other peripheral devices. Such peripheral devices may include, for example, a compact disc (CD) player, digital versatile disc (DVD) player, or the like. A user may use the network port to share generated playlists with other user devices and to publish characterizations of the generated playlists. If the end user device is the device receiving a shared playlist, the network port 38 is configured to allow the end user device to connect to the data communications network 14 to receive the shared playlist, and to receive the characterization of the shared playlist.

The memory 32 may include a read only memory, random access memory, flash memory, and the like. According to one embodiment, the memory includes computer instructions which are executed by the processor 30 for generating a particular playlist and acoustic characterization of the playlist, and sharing the playlist with another user. If the end user device is the device receiving a shared playlist, the memory 32 also includes computer instructions which are executed by the processor 30 for detecting gaps in the shared playlist. Such gaps may exist due to the receiving user device not having access to a particular song in the shared playlist, or because the user device does not support a format of the particular song. In this regard, the memory includes computer instructions for accessing the playlist characterization and filling the gaps in the playlist with songs to which the user devices has access based on the characterization information.

Figure 3:
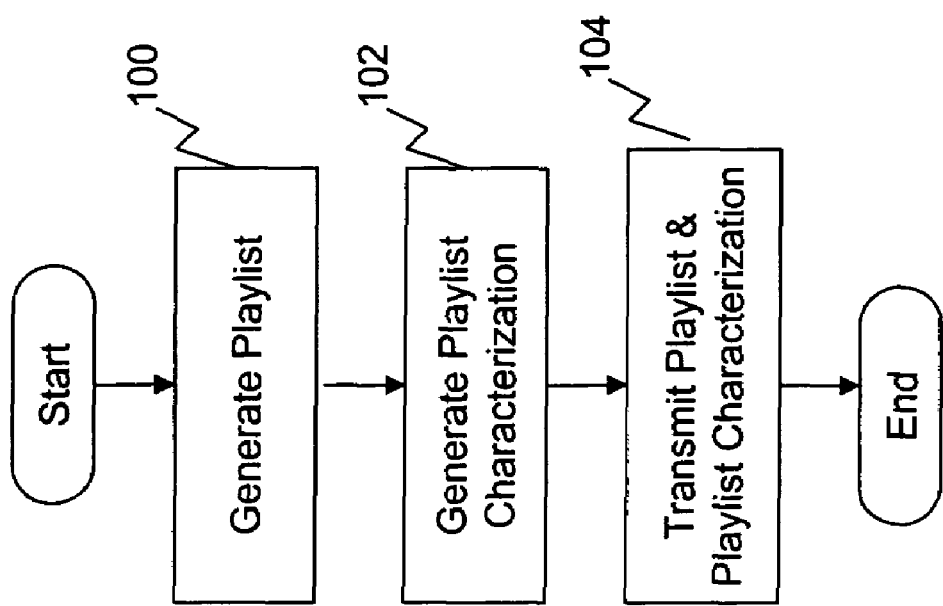
FIG. 3 is a flow diagram of a process for sharing playlists according to one embodiment of the invention.

FIG. 3 is a flow diagram of a process executed by the processor 30 of the user device 10, 12 for sharing playlists according to one embodiment of the invention. In step 100, the processor generates a playlist 100 responsive to a user input. The user input may be, for example, a manual selection of the songs to the included into the playlist. The user input may also be selection of a particular playlist criteria (e.g. a particular song, artist, album, or genre), and a command to generate the playlist based on the playlist criteria.

In step 102, the processor 30 generates the playlist characterization. For example, the playlist characterization may be composed of acoustic analysis data for each individual song in the playlist. Alternatively or in addition to any individual acoustic analysis data, the playlist characterization may include profile information based on the songs in the playlist or one or more artists and/or albums associated with the playlist.

In step 104, the processor transmits the generated playlist and playlist characterization for sharing with one or more other end user devices. The processor may also transmit the metadata of the songs included in the playlist, and/or unique identifiers for each song, such as, for example, song fingerprint information. According to one embodiment of the invention, the playlist along with any metadata and fingerprint information (collectively referred to as simply the playlist), and playlist characterization are submitted to a website hosted by the server 16. The server 16 may then transmit the playlist and playlist characterization to the user end device 12 as an e-mail transmission, or transmit an e-mail notification that the playlist and/or playlist characterization is available for downloading. Alternatively, the user end device 10 may transmit the playlist and/or playlist characterization directly to the user end device 12 via, for example, a peer-to-peer network or a private area network.

Figure 4:
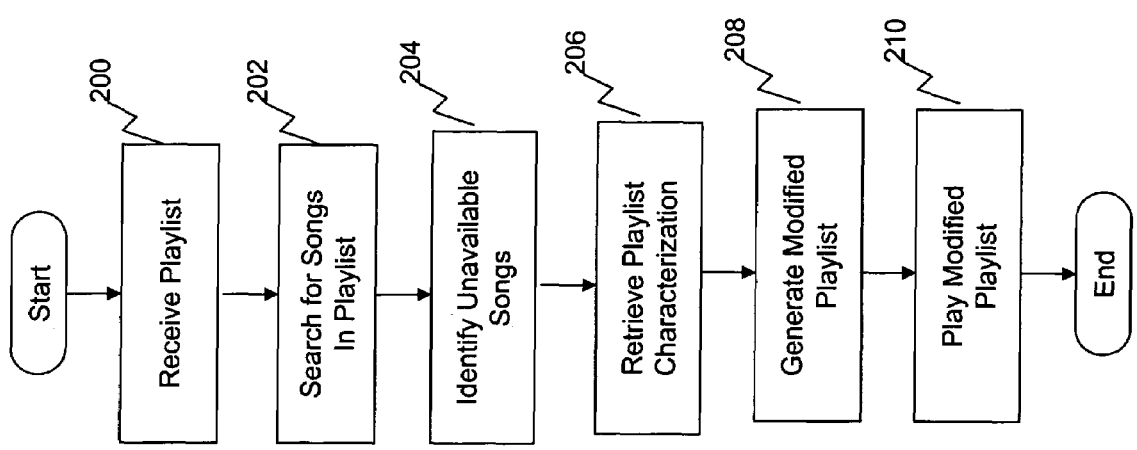
FIG. 4 is a flow diagram of a process for receiving and playing shared playlists according to one embodiment of the invention.

FIG. 4 is a flow diagram of a process executed by the processor 30 of the user device 12, 14 for receiving and playing shared playlists according to one embodiment of the invention. In step 200, the processor 30 receives a shared playlist and in step 202, searches its mass storage device 40 or any other peripheral device for the songs in the playlist. In this regard, the processor 30 may run a search and retrieval algorithm based on the metadata of each song in the playlist. The processor 30 may also, in addition or in lieu of the metadata search, conduct a search of fingerprint information transmitted for each song.

In step 204, the processor 30 identifies songs that are unavailable in the mass storage device 40 based on the metadata and/or fingerprint search. In step 206, the processor 30 retrieves the playlist characterization information, and in step 208, generates a modified playlist based on the playlist characterization information. The modified playlist includes songs selected by the processor to replace the identified unavailable songs using the playlist characterization information.

For example, the replacement song may be selected based on a comparison of an acoustic vector retrieved for the replacement song and the acoustic analysis data of the unavailable song. The replacement song may also be selected based on a weighted combination of the individual acoustic analysis data and group profile data (e.g. profile data for the entire playlist). In this latter scenario, the weight to be afforded to the profile data may be user-determined via a slider that indicates how much weight to give to the profile data.

The replacement songs may be selected from the user's existing collection as stored in the mass storage device 40. The replacement songs may also be selected from a remote database 20. The user may select the particular remote database 20 from which songs are to be selected.

In step 210, the processor proceeds to play the songs in the modified playlist.

According to another embodiment of the invention, instead of the user device generating the playlist characterization, it is the server 16 or receiving user device that does the generating.

According to a further embodiment of the invention, it is the server 16 that generates the modified playlist by filling-in the gaps in the original playlist. The modified playlist is then transmitted to the receiving user device.

Although this invention has been described in certain specific embodiments, those skilled in the art will have no difficulty devising variations to the described embodiment which in no way depart from the scope and spirit of the present invention. For example, the steps of the processes may be executed in the indicated order or in any other order recognized by a person of skill in the art.

In addition, to those skilled in the various arts, the invention itself herein will suggest solutions to other tasks and adaptations for other applications. For example, although the various embodiments are directed to a music recommendation system and method, these embodiments may be extended to other genres or products, such as, for example, food, movies, books, art, or the like. It is the Applicants' intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computer-implemented method for sharing playlists comprising:
    selecting one or more songs from a first data store;
    generating a playlist based on the selected songs;
    retrieving acoustic analysis data of one or more songs in the playlist;
    generating a playlist characterization based on the acoustic analysis data;
    transmitting the playlist and the playlist characterization to a remote end device coupled to a second data store, wherein at least one of the songs in the playlist is unavailable in the second data store;
    generating by the remote end device a modified playlist based on the received playlist characterization, wherein the generating includes automatically replacing the unavailable song in the playlist with a replacement song available in the second data store, the replacement song being automatically selected by the remote end device based on the playlist characterization; and
    playing the modified playlist via the remote end device.

2. The method of claim 1, wherein the playlist and the playlist characterization are transmitted to a server for downloading by the remote end device.

3. The method of claim 1, wherein the playlist characterization is based on acoustic analysis data of at least one song in the playlist.

4. The method of claim 1, wherein the playlist characterization is based on a group profile of the playlist, the group profile being generated based on acoustic analysis data of a plurality of songs in the playlist.

5. The method of claim 1, wherein the playlist characterization is based on a group profile of an artist associated with the playlist.

6. The method of claim 1, wherein the playlist characterization is based on a group profile of an album associated with the playlist.

7. The method of claim 1, wherein the playlist characterization is based on the acoustic analysis data of a plurality of the songs in the playlist, the acoustic analysis data being generated via a computerized analysis of acoustic signals of the plurality of the songs.

8. The method of claim 1, wherein the playlist characterization includes acoustic analysis data of the unavailable song, and the replacement song is selected based an a computer-implemented comparison of the acoustic analysis data of the unavailable song and acoustic analysis data of the replacement song.

9. An end user device in a system for sharing playlists, the end user device comprising:
   a first data store storing a plurality of songs and acoustic analysis data for the plurality of the songs;
   a processor; and
   a memory coupled to the processor, and having program instructions stored therein, the processor being operable to execute the program instructions, the program instructions including:
      selecting one or more songs from the first data store;
      generating a playlist based on the selected songs;
      retrieving acoustic analysis data of one or more songs in the playlist; and
      generating a playlist characterization based on the acoustic analysis data; and
   a network connection for transmitting the playlist and the playlist characterization to a remote end device coupled to a second data store, wherein at least one of the songs in the playlist is unavailable in the second data store, wherein the remote end device is configured to generate a modified playlist based on the received playlist characterization, wherein the generating includes automatically replacing the unavailable song in the playlist with a replacement song available in the second data store, the replacement song being automatically selected by the remote end device based on the playlist characterization, the remote end device being further configured to play the modified playlist.

10. The end user device of claim 9, wherein the playlist and the playlist characterization are transmitted to a server for downloading by the remote end device.

11. The end user device of claim 9, wherein the playlist characterization is based on acoustic analysis data of at least one song in the playlist.

12. The end user device of claim 9, wherein the playlist characterization is based on a group profile of the playlist, the group profile being generated based on acoustic analysis data of a plurality of songs in the playlist.

13. The end user device of claim 9, wherein the playlist characterization is based on a group profile of an artist associated with the playlist.

14. The end user device of claim 9, wherein the playlist characterization is based on a group profile of an album associated with the playlist.

* * * * *